United States Patent
Awaya et al.

(10) Patent No.: US 12,160,191 B2
(45) Date of Patent: Dec. 3, 2024

(54) MOTOR CONTROL DEVICE, BRUSHLESS DC MOTOR, ACTUATOR, AND EGR VALVE DEVICE

(71) Applicant: Mitsubishi Electric Corporation, Tokyo (JP)

(72) Inventors: Ryo Awaya, Tokyo (JP); Sachiko Kawasaki, Tokyo (JP); Tomokuni Kato, Tokyo (JP); Taihei Kawasaka, Tokyo (JP); Naoki Imamura, Tokyo (JP); Satoshi Kawamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 198 days.

(21) Appl. No.: 18/009,891

(22) PCT Filed: Aug. 6, 2020

(86) PCT No.: PCT/JP2020/030106
§ 371 (c)(1),
(2) Date: Dec. 12, 2022

(87) PCT Pub. No.: WO2022/029949
PCT Pub. Date: Feb. 10, 2022

(65) Prior Publication Data
US 2023/0223881 A1    Jul. 13, 2023

(51) Int. Cl.
*H02P 23/14*    (2006.01)
*H02P 25/03*    (2016.01)

(52) U.S. Cl.
CPC .............. *H02P 23/14* (2013.01); *H02P 25/03* (2016.02)

(58) Field of Classification Search
CPC .................................. H02P 23/14; H02P 25/03
See application file for complete search history.

(56) References Cited

U.S. PATENT DOCUMENTS

| | | | |
|---|---|---|---|
| 2004/0008002 A1* | 1/2004 | Kamio | H02P 6/12 318/701 |
| 2004/0040798 A1 | 3/2004 | Fujita et al. | |

(Continued)

FOREIGN PATENT DOCUMENTS

| | | |
|---|---|---|
| JP | 2004-343822 A | 12/2004 |
| JP | 2005-124359 A | 5/2005 |

(Continued)

OTHER PUBLICATIONS

International Search Report (PCT/ISA/210) issued in PCT/JP2020/030106, dated Nov. 2, 2020.

(Continued)

*Primary Examiner* — Zoheb S Imtiaz
(74) *Attorney, Agent, or Firm* — Birch, Stewart, Kolasch & Birch, LLP

(57) ABSTRACT

A motor control device includes: a first duty ratio computation unit to compute a first duty ratio to be used for control of a motor body portion on the basis of a target rotational position of a rotor and a rotational position of the rotor; a second duty ratio computation unit to compute a second duty ratio corresponding to an upper limit of the absolute value of the first duty ratio on the basis of a linear function including a variable corresponding to the number of rotations of the rotor; and a control signal output unit to output a control signal corresponding to the first duty ratio when the absolute value of the first duty ratio is smaller than the absolute value of the second duty ratio, and to output a control signal corresponding to the second duty ratio when it is not.

15 Claims, 13 Drawing Sheets

(56) References Cited

U.S. PATENT DOCUMENTS

| | | | |
|---|---|---|---|
| 2007/0006845 A1* | 1/2007 | Williams | F02D 11/107 |
| | | | 318/681 |
| 2008/0024081 A1* | 1/2008 | Isobe | H02P 29/032 |
| | | | 318/473 |
| 2008/0129236 A1* | 6/2008 | Isobe | F16H 63/3466 |
| | | | 318/468 |
| 2009/0247359 A1* | 10/2009 | Matsuo | F16H 61/16 |
| | | | 701/55 |
| 2010/0283416 A1 | 11/2010 | Onishi et al. | |
| 2013/0069575 A1 | 3/2013 | Hano et al. | |
| 2021/0164561 A1* | 6/2021 | Azuma | B60K 23/0808 |

FOREIGN PATENT DOCUMENTS

| | | |
|---|---|---|
| JP | 2007-274764 A | 10/2007 |
| JP | 2013-70467 A | 4/2013 |
| JP | 2014-7882 A | 1/2014 |
| JP | 2015-139232 A | 7/2015 |
| WO | WO 2003/026123 A1 | 3/2003 |
| WO | WO 2009/110206 A1 | 9/2009 |
| WO | WO 2019/244243 A1 | 12/2019 |

OTHER PUBLICATIONS

Written Opinion of the International Searching Authority (PCT/ISA/237) issued in PCT/JP2020/030106, dated Nov. 2, 2020.
Japanese Office Action for Japanese Application No. 2022-541035, dated Jul. 4, 2023, with an English translation.

* cited by examiner

MOTOR CONTROL DEVICE, BRUSHLESS DC MOTOR, ACTUATOR, AND EGR VALVE DEVICE

TECHNICAL FIELD

The present disclosure relates to a motor control device, a brushless DC motor, an actuator, and an EGR valve device.

BACKGROUND ART

Conventionally, an actuator is used for the opening control of a valve in a vehicle. Concretely, for example, an actuator is used for the opening control of an exhaust gas recirculation (EGR) valve, a wastegate valve, or a throttle valve. Further, a motor is used in such an actuator. Concretely, for example, a brushless direct current (DC) motor is used.

CITATION LIST

Patent Literature

Patent Literature 1: JP 2005-124359 A

SUMMARY OF INVENTION

Technical Problem

From the viewpoint of protecting the electronic parts in the motor, and the viewpoint of preventing an increase in the temperature in the motor, the control of a current value in the motor to a value smaller than a predetermined value is demanded. On the other hand, from the viewpoint of increasing the torque in the motor, an increase in the current value in the motor may be demanded. In this case, it is preferable to control the current value in the motor to a value (referred to as a "maximum value" hereinafter) smaller than the predetermined value and mostly close to the predetermined value.

In order to implement such control, it is possible to use feedback of the current value (for example, refer to Patent Literature 1).

However, a problem with this case is that from the viewpoint of implementing the feedback of the current value and the viewpoint of performing a computation which is based on the fed-back current value, the circuit configuration of the motor becomes complicated.

The present disclosure is made in order to solve the above-mentioned problem, and it is therefore an object of the present disclosure to provide a technique of controlling a current value to a value smaller than a predetermined value with a simple circuit configuration.

Solution to Problem

A motor control device according to the present disclosure includes: processing circuitry to acquire a target rotational position of a rotor in a motor body portion; to compute a rotational position of the rotor using a pulse signal outputted by a rotational position sensor in the motor body portion; to compute the number of rotations of the rotor on the basis of the rotational position; to compute a first duty ratio to be used for the control of the motor body portion on the basis of the target rotational position and the rotational position; a second duty ratio computation unit to compute a second duty ratio corresponding to an upper limit of the absolute value of the first duty ratio on the basis of a first linear function including a variable corresponding to the number of rotations; and to output a control signal corresponding to the first duty ratio when the absolute value of the first duty ratio is smaller than the absolute value of the second duty ratio, and to output a control signal corresponding to the second duty ratio when the absolute value of the second duty ratio is smaller than the absolute value of the first duty ratio. A slope of the first linear function is computed on a basis of a second linear function which includes, as a variable, a difference between an ambient temperature of a board in the motor body portion and a reference temperature. As the difference increases, the slope increases. As the difference decreases, the slope decreases.

Advantageous Effects of Invention

The present disclosure configured as above can control a current value to a value smaller than a predetermined value with a simple circuit configuration.

DESCRIPTION OF EMBODIMENTS

Hereinafter, in order to explain the present disclosure in greater detail, an embodiment of the present disclosure will be explained with reference to the accompanying drawings.

Embodiment 1

Figure 1:
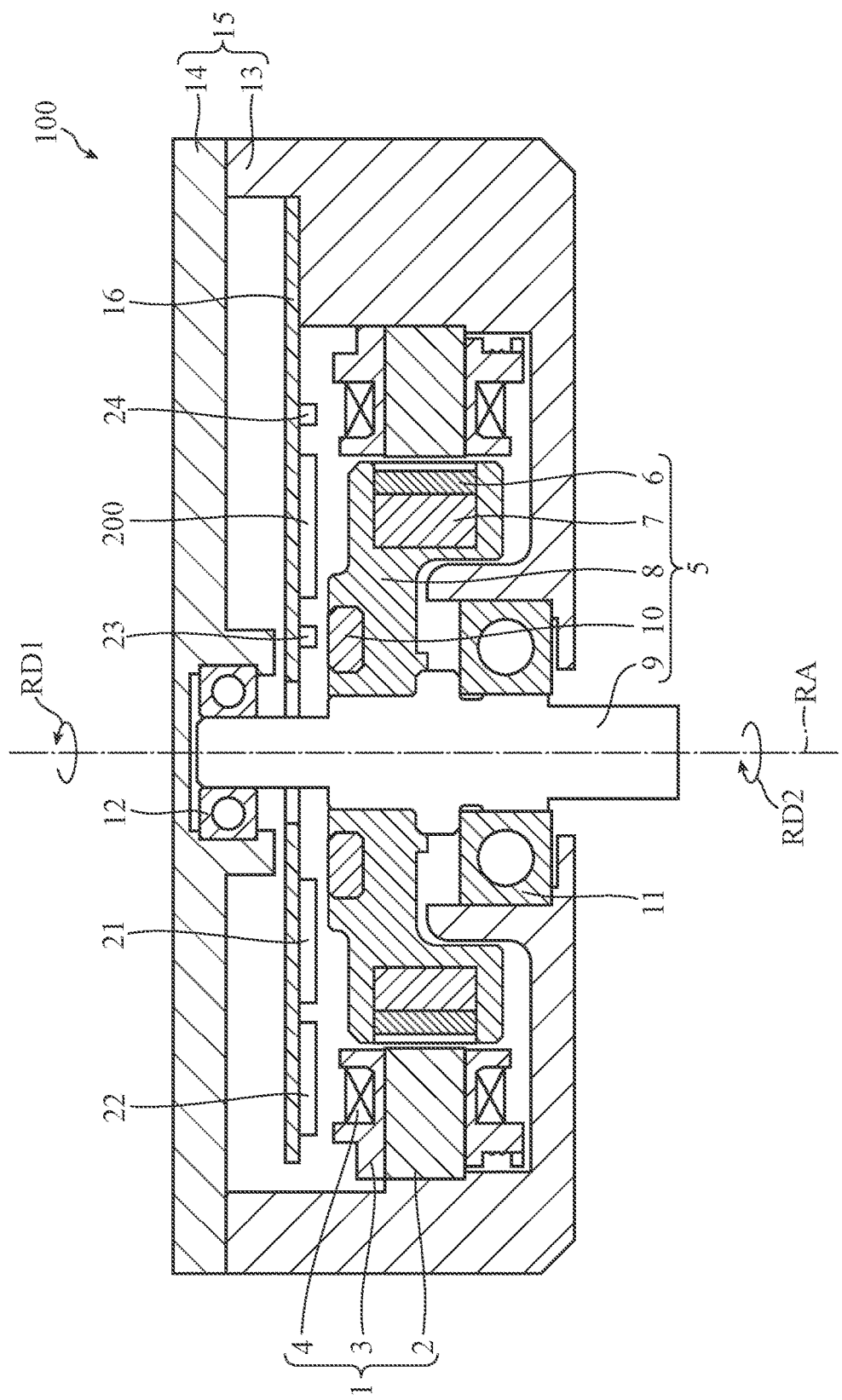
FIG. 1 is a cross-sectional view showing a main part of a brushless DC motor which includes a motor control device according to Embodiment 1.
Figure 2:
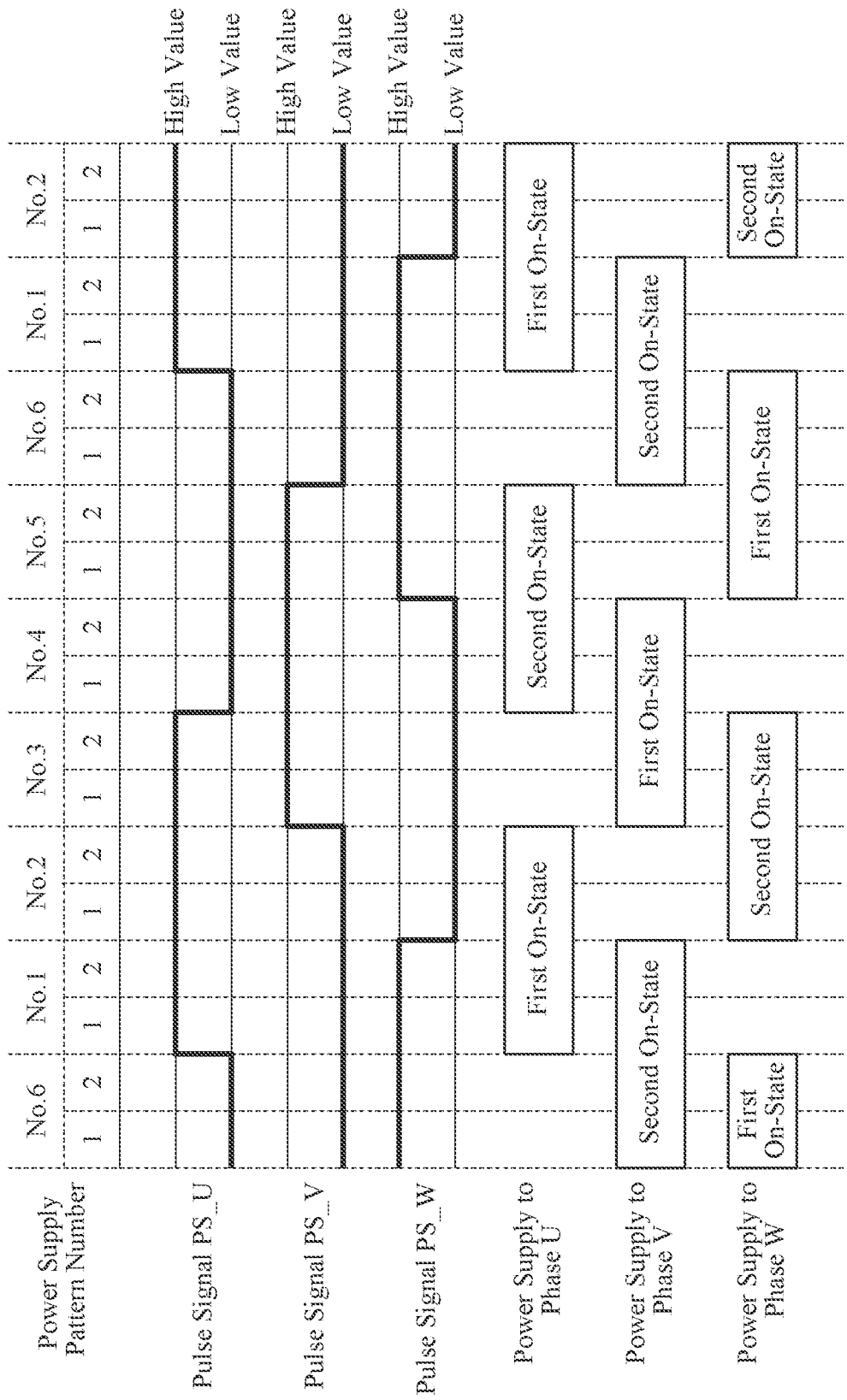
FIG. 2 is an explanatory drawing showing an example of a pulse signal outputted by each magnetic sensor, and an example of times when power supply to each phase is in an on-state.
Figure 3:
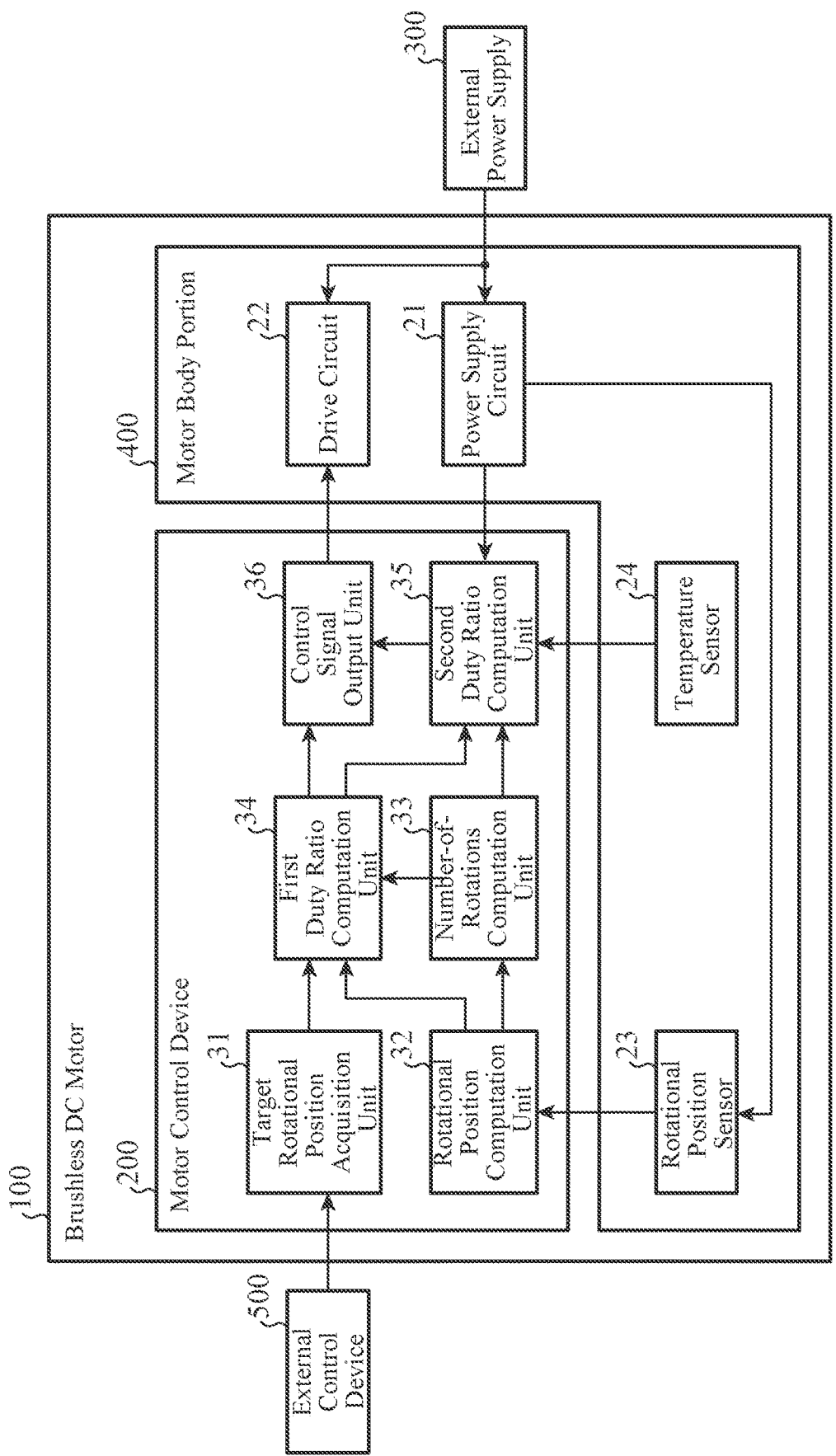
FIG. 3 is a block diagram showing the main part of the brushless DC motor which includes the motor control device according to Embodiment 1.

FIG. 1 is a cross-sectional view showing a main part of a brushless DC motor which includes a motor control device according to Embodiment 1. FIG. 2 is an explanatory drawing showing an example of a pulse signal outputted by each magnetic sensor, and an example of times when power supply to each phase is in an on-state. FIG. 3 is a block diagram showing the main part of the brushless DC motor which includes the motor control device according to Embodiment 1. By referring to FIGS. 1 to 3, the brushless DC motor including the motor control device according to Embodiment 1 will be explained.

As shown in FIG. 1, the brushless DC motor 100 has an approximately cylindrical stator 1. The stator 1 includes a stator core 2, an insulator 3, and a coil 4. Further, a rotor 5 is passed through the stator 1. In other words, the stator 1 is disposed in an outer peripheral region outside the rotor 5. The rotor 5 includes a main magnet 6, a rotor core 7, a resin molded portion 8, and a shaft 9. The main magnet 6 is disposed while facing the stator 1. In addition, the rotor 5 includes a sensor magnet 10. The sensor magnet 10 is disposed while facing a board 16 which will be mentioned later. The rotor 5 is supported rotatably with respect to the stator 1 by bearings 11 and 12.

In the figure, RA represents a rotation axis of the rotor 5. Further, RD1 represents a direction of rotation of the rotor 5. Further, RD2 represents another direction of rotation of the rotor 5. Hereinafter, the direction corresponding to either one of the directions of rotation RD1 and RD2 is referred to as the "forward rotation direction." Further, the direction corresponding to the other one of the directions of rotation RD1 and RD2 is referred to as the "reverse rotation direction." More specifically, the forward rotation direction corresponds to the forward rotation of the rotor 5. On the other hand, the reverse rotation direction corresponds to the reverse rotation of the rotor 5.

A housing portion 15 of the brushless DC motor 100 is constituted by a housing 13 and a cover 14. The stator 1, the rotor 5, and the bearings 11 and 12 are contained in the housing portion 15. However, a leading end portion of the shaft 9 projects outside the housing portion 15. Further, the board 16 is contained in the housing portion 15.

Multiple circuits are disposed on the board 16. The multiple circuits include a control circuit (i.e., the motor control device 200), a power supply circuit 21, and a drive circuit 22. Further, multiple sensors are disposed on the board 16. The multiple sensors include a rotational position sensor 23 and a temperature sensor 24.

The power supply circuit 21 supplies power for operation to the motor control device 200 by using power supplied by an external power supply 300. The power supply circuit 21 also supplies power for operation to the rotational position sensor 23 by using the power supplied by the external power supply 300. The external power supply 300 is disposed outside the brushless DC motor 100. The external power supply 300 is constituted by, for example, a vehicle-mounted battery. In FIG. 1, the external power supply 300 is not illustrated.

The drive circuit 22 drives the rotor 5 by supplying a current to the coil 4 under the control of the motor control device 200 by using the power supplied by the external power supply 300. Here, the brushless DC motor 100 is of a three-phase type. The drive circuit 22 includes two switching elements SE_H and SE_L for each phase. More concretely, the drive circuit 22 includes a switching element SE_H_U corresponding to a high side of a phase U, a switching element SE_L_U corresponding to a low side of the phase U, a switching element SE_H_V corresponding to a high side of a phase V, a switching element SE_L_V corresponding to a low side of the phase V, a switching element SE_H_W corresponding to a high side of a phase W, and a switching element SE_L_W corresponding to a low side of the phase W. A field effect transistor (FET) is used as each switching element SE.

First, by controlling the switching element SE_H_U in such a way that the switching element is continuously in the off-state, and controlling the switching element SE_L_U in such a way that the switching element is continuously in the on-state, the power supply to the phase U is brought into the on-state. Further, by controlling the switching element SE_H_V in such a way that the switching element is continuously in the off-state, and controlling the switching element SE_L_V in such a way that the switching element is continuously in the on-state, the power supply to the phase V is brought into the on-state. Further, by controlling the switching element SE_H_W in such a way that the switching element is continuously in the off-state, and controlling the switching element SE_L_W in such a way that the switching element is continuously in the on-state, the power supply to the phase W is brought into the on-state. Hereinafter, these states are generically referred to as the "first on-state."

Second, by causing the switching element SE_H_U to operate by pulse width modulation (PWM), and causing the switching element SE_L_U to operate by PWM, the power supply to the phase U is brought into the on-state. Further, by causing the switching element SE_H_V to operate by PWM, and causing the switching element SE_L_V to operate by PWM, the power supply to the phase V is brought into the on-state. Further, by causing the switching element SE_H_W to operate by PWM, and causing the switching element SE_L_W to operate by PWM, the power supply to the phase W is brought into the on-state. Hereinafter, these states are generically referred to as the "second on-state."

During the rotation of the rotor 5, the power supply to the phase U, the power supply to the phase V, and the power supply to the phase W enter their respective on-states in order. In other words, when the power supply to the phase U, the power supply to the phase V, and the power supply to the phase W enter their respective on-states in order, the rotor 5 rotates. FIG. 2 shows an example of times when the power supply to each phase is in the on-state.

The rotational position sensor 23 includes a magnetic sensor MS for each phase. More specifically, the rotational position sensor 23 includes a magnetic sensor MS_U corresponding to the phase U, a magnetic sensor MS_V corresponding to the phase V, and a magnetic sensor MS_W corresponding to the phase W. A hall integrated circuit (IC) is used as each magnetic sensor MS.

Here, each magnetic sensor MS is disposed while facing the rotor 5. As mentioned above, the sensor magnet 10 is disposed in the rotor 5, and the sensor magnet 10 is disposed while facing the board 16. The number of poles of the sensor magnet 10 is set to be equal to the number of field systems of the brushless DC motor 100.

This causes a pulse signal PS to be outputted by each magnetic sensor MS during the rotation of the rotor 5. More concretely, a pulse signal PS_U is outputted by the magnetic sensor MS_U. Further, a pulse signal PS_V is outputted by the magnetic sensor MS_V. Further, a pulse signal PS_W is outputted by the magnetic sensor MS_W. FIG. 2 shows an example of the pulse signal PS outputted by each magnetic sensor MS.

For example, a thermistor is used as the temperature sensor 24. The temperature sensor 24 detects a temperature T in the brushless DC motor 100.

The main part of the brushless DC motor 100 is constituted in this way. Hereinafter, a portion of the brushless DC motor 100, the portion excluding the motor control device 200, is generically referred to as the "motor body portion." In other words, the brushless DC motor 100 includes the motor control device 200 and the motor body portion 400.

Hereinafter, the motor control device 200 will be explained by referring to FIG. 3. In FIG. 3, a portion of the motor body portion 400, the portion excluding the power supply circuit 21, the drive circuit 22, the rotational position sensor 23, and the temperature sensor 24, is not illustrated.

As shown in FIG. 3, the motor control device 200 includes a target rotational position acquisition unit 31, a rotational position computation unit 32, a number-of-rotations computation unit 33, a first duty ratio computation unit 34, a second duty ratio computation unit 35, and a control signal output unit 36. Further, an external control device 500 is disposed outside the brushless DC motor 100. The external control device 500 is constituted by, for example, an electronic control unit (ECU) at a higher level than the motor control device 200.

The external control device 500 outputs a command signal for the motor control device 200. The outputted command signal includes a target rotational position TRP of the rotor 5 at each time $t_n$. The target rotational position acquisition unit 31 acquires the outputted command signal. Thereby, the target rotational position acquisition unit 31 acquires the target rotational position TRP of the rotor 5 at each time $t_n$.

The rotational position computation unit 32 acquires the pulse signal PS outputted by each magnetic sensor MS. The rotational position computation unit 32 computes a rotational position RP of the rotor 5 at each time $t_n$, using the acquired pulse signal PS.

The number-of-rotations computation unit 33 acquires the rotational position RP computed by the rotational position computation unit 32. The number-of-rotations computation unit 33 computes a rotation speed N of the rotor 5 (referred to as the "number of rotations" hereinafter), using the acquired rotational position RP.

More concretely, the number-of-rotations computation unit 33 computes, as to the rotational position RP at each time $(t_n)$, a difference value $\Delta RP$ with respect to the rotational position RP at a previous time $(t_{n-1})$. The number-of-rotations computation unit 33 computes the number of rotations N at the corresponding time $(t_n)$ on the basis of the computed difference value $\Delta RP$.

The first duty ratio computation unit 34 acquires the target rotational position TRP acquired by the target rotational position acquisition unit 31, the rotational position RP computed by the rotational position computation unit 32, and the number of rotations N computed by the number-of-rotations computation unit 33. The first duty ratio computation unit 34 computes a duty ratio DR1 to be used for the control of each switching element SE (referred to as the "first duty ratio" hereinafter), using the acquired target rotational position TRP, the acquired rotational position RP, and the acquired number of rotations N.

More specifically, the first duty ratio computation unit 34 computes, as to the rotational position RP at each time $(t_n)$, a difference $\Delta P1$ with respect to the target rotational position TRP at the corresponding time $(t_n)$. The first duty ratio computation unit 34 also computes, as to the target rotational position TRP at each time $(t_n)$, a difference $\Delta P2$ with respect to the target rotational position TRP at the previous time $(t_{n-1})$. The first duty ratio computation unit 34 computes the first duty ratio DR1 on the basis of a predetermined computation expression, using the computed difference $\Delta P1$, the computed difference $\Delta P2$, and the above-mentioned acquired number of rotations N.

This computation expression is based on, for example, a combination of I-PD control and feedforward control (FF control). At this time, the first duty ratio computation unit 34 uses the above-mentioned computed difference $\Delta P1$ for the coefficient of an integral term (I term). The first duty ratio computation unit 34 also uses the above-mentioned acquired number of rotations N for the coefficient of a proportional term (P term). The first duty ratio computation unit 34 further uses the above-mentioned computed difference $\Delta P2$ for the coefficient of a feedforward term (FF term).

The first duty ratio DR1 is computed in this way. More specifically, the first duty ratio DR1 is computed by the feedback of the rotational position RP. When the rotor 5 is driven in the forward rotation direction, the first duty ratio DR1 is set to a positive value. In contrast, when the rotor 5 is driven in the reverse rotation direction, the first duty ratio DR1 is set to a negative value.

The second duty ratio computation unit 35 acquires information indicating whether or not the first duty ratio DR1 computed by the first duty ratio computation unit 34 is positive or negative (referred to as the "positive/negative information" hereinafter). The second duty ratio computation unit 35 also acquires the number of rotations N detected by the number-of-rotations computation unit 33. The second duty ratio computation unit 35 computes a duty ratio DR2 corresponding to an upper limit of the absolute value of the first duty ratio DR1 (referred to as the "second duty ratio" hereinafter), using the acquired positive/negative information and the acquired number of rotations N.

More concretely, when the above-mentioned computed first duty ratio DR1 is a positive value, the second duty ratio computation unit 35 computes the second duty ratio DR2 using a linear function shown in the following equation (1). In contrast, when the above-mentioned computed first duty ratio DR1 is a negative value, the second duty ratio computation unit 35 computes the second duty ratio DR2 using a linear function shown in the following equation (2).

$$DR2 = aN + b \tag{1}$$

$$DR2 = aN - b \tag{2}$$

More specifically, each linear function used for the computation of the second duty ratio DR2 includes a variable corresponding to the number of rotations N. Each linear function used for the computation of the second duty ratio DR2 also includes a slope a and an intercept b. Whether the intercept b is positive or negative is set depending on whether the first duty ratio DR1 is positive or negative.

Figure 4:
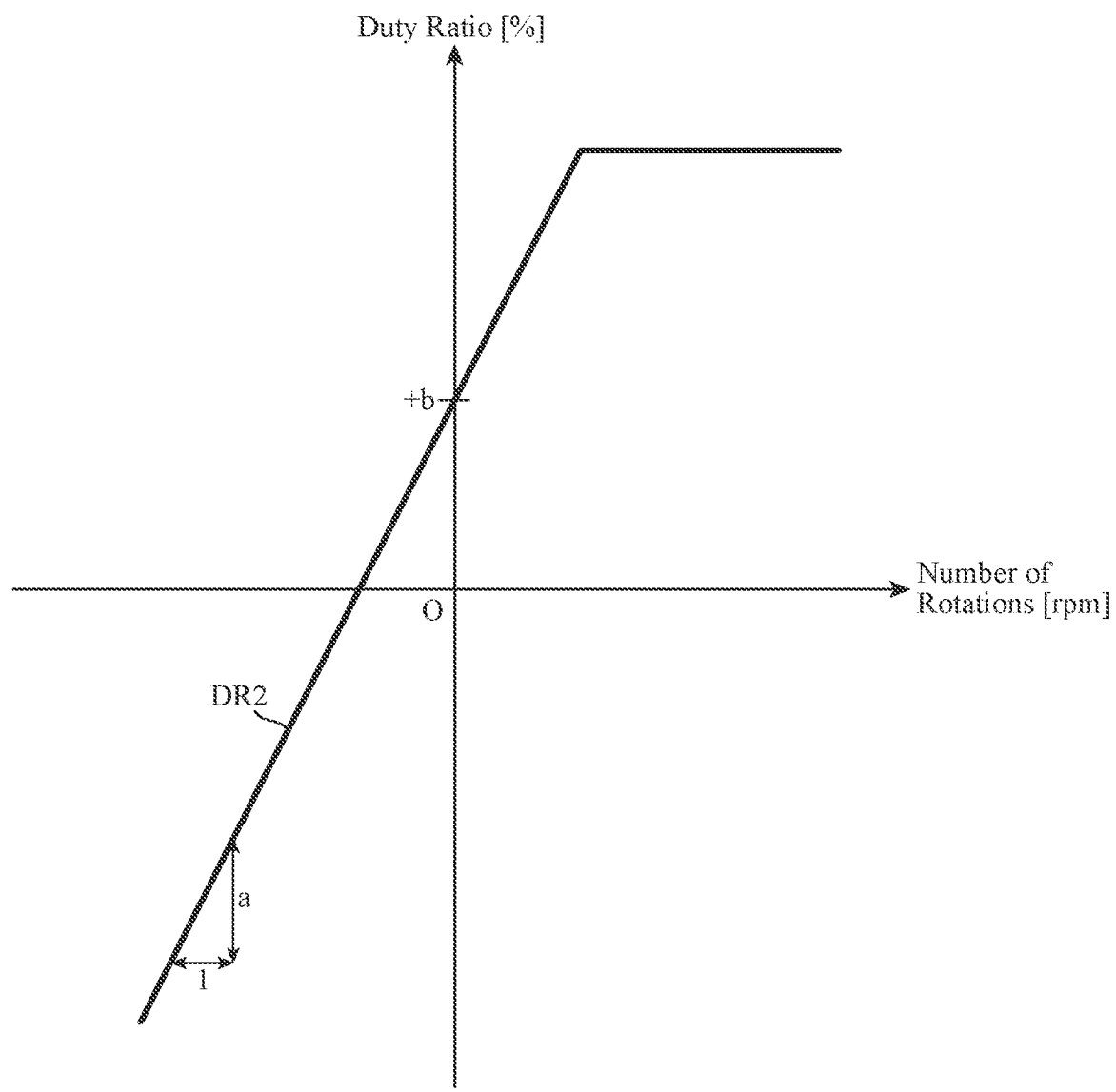
FIG. 4 is an explanatory drawing showing a graph of a second duty ratio corresponding to a linear function having a positive intercept.
Figure 5:
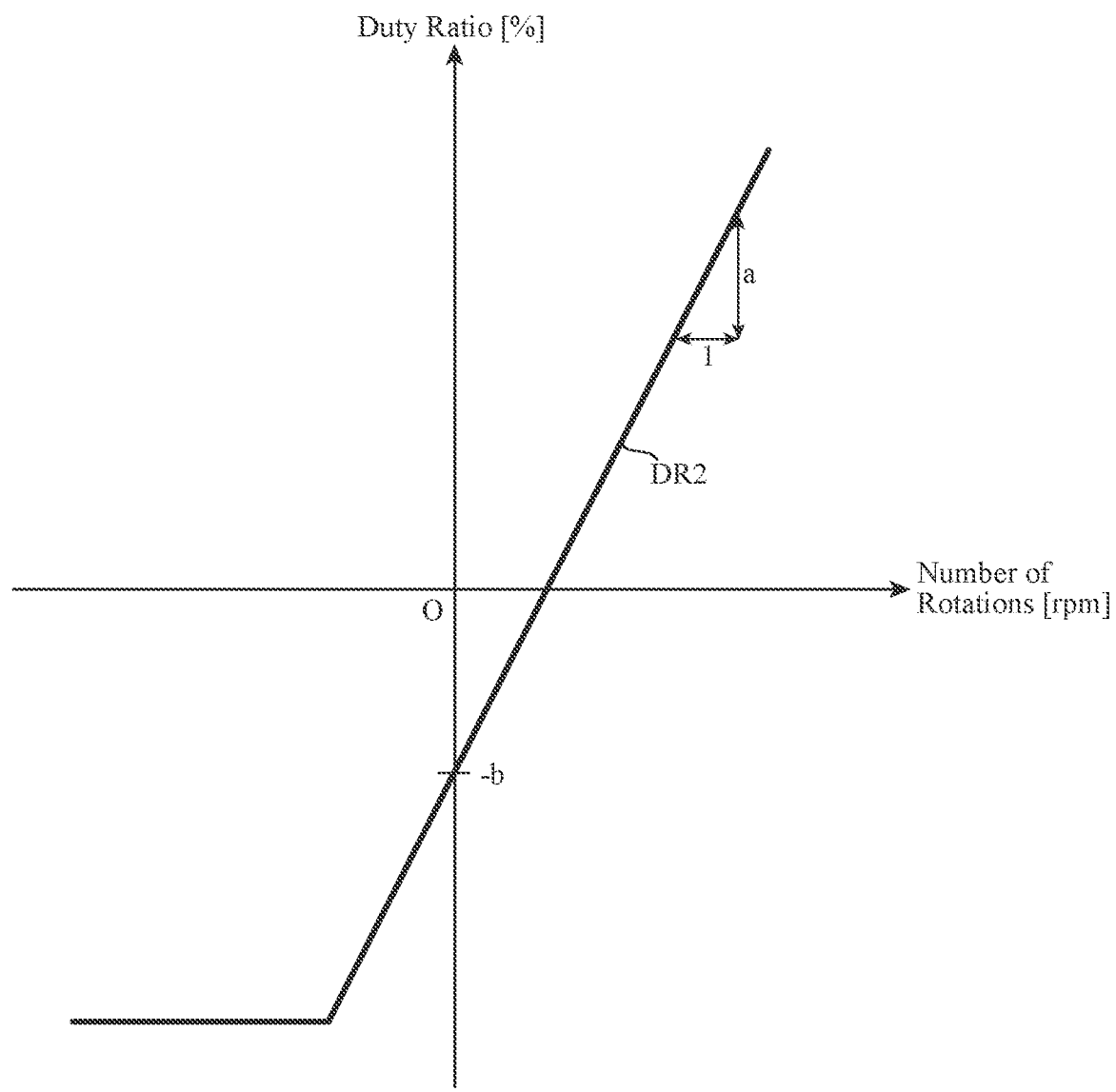
FIG. 5 is an explanatory drawing showing a graph of the second duty ratio corresponding to a linear function having a negative intercept.
Figure 6:
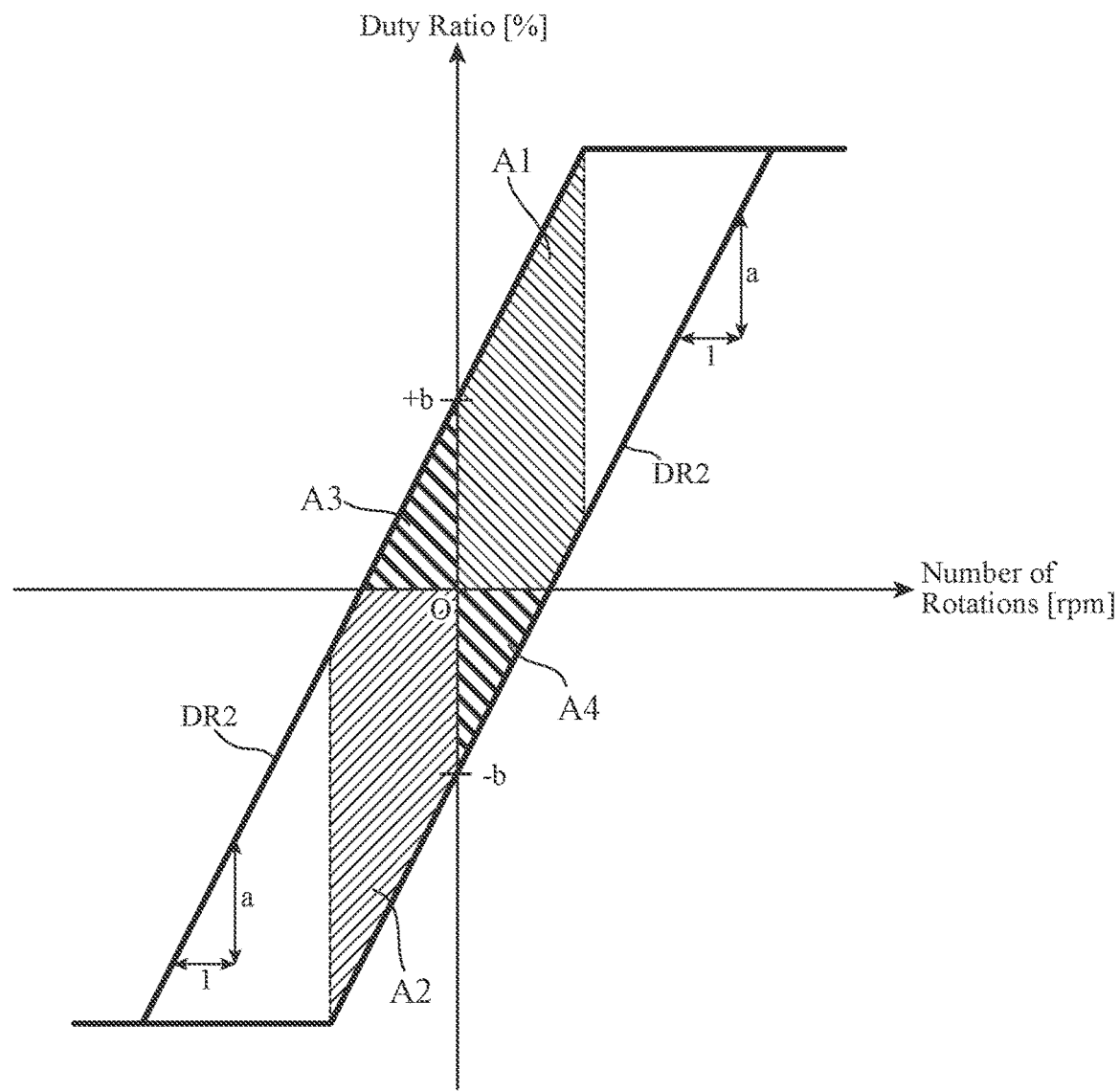
FIG. 6 is an explanatory drawing showing a graph of the second duty ratio computed by a second duty ratio computation unit.

FIG. 4 shows a graph of the second duty ratio DR2 corresponding to the linear function shown in the equation (1). More specifically, FIG. 4 shows a graph of the second duty ratio DR2 corresponding to the linear function having a positive intercept (+b). In contrast, FIG. 5 shows a graph of the second duty ratio DR2 corresponding to the linear function shown in the equation (2). More specifically, FIG. 5 shows a graph of the second duty ratio DR2 corresponding to the linear function having a negative intercept (−b). FIG. 6 shows a graph of the second duty ratio DR2 computed by the second duty ratio computation unit 35.

Here, the second duty ratio computation unit 35 sets the slope a in the following way. The second duty ratio computation unit 35 also sets the intercept b in the following way.

More specifically, the second duty ratio computation unit 35 acquires the temperature T in the brushless DC motor 100 from the temperature sensor 24. The second duty ratio computation unit 35 computes a difference value ΔT between the acquired temperature T and a predetermined reference temperature T_ref. Further, the second duty ratio computation unit 35 acquires a power supply voltage V in the brushless DC motor 100 from the power supply circuit 21.

The second duty ratio computation unit 35 computes K using the following equation (3), and computes the slope a using the following equation (4). Here, ke denotes a phase induced voltage constant. α denotes a temperature coefficient of a magnetic force. β denotes a predetermined constant.

$$K = ke \times (1 + \alpha \times \Delta T) \quad (3)$$

$$a = K/(V \times \beta) \quad (4)$$

The second duty ratio computation unit 35 computes R using the following equation (5), and computes the intercept b using the following equation (6). Here, r denotes phase resistance. γ denotes a temperature coefficient of the resistance. i_lim denotes a phase current limit value. δ denotes a predetermined constant. The phase current limit value i_lim corresponds to an allowable maximum of a current value i in each phase.

$$R = r \times (1 + \gamma \times T) \quad (5)$$

$$b = R \times i\_lim/(V \times \delta) \quad (6)$$

In this way, the slope a is set to a value which differs depending on the difference value ΔT, and which also differs depending on the power supply voltage V. Further, the slope a is set to a value which depends on the phase induced voltage constant ke. Further, the intercept b is set to a value which differs depending on the difference value ΔT, and which also differs depending on the power supply voltage V. Further, the intercept b is set to a value which depends on the phase resistance r. Further, the intercept b is set to a value which depends on the phase current limit value i_lim.

The control signal output unit 36 acquires the first duty ratio DR1 computed by the first duty ratio computation unit 34, and also acquires the second duty ratio DR2 computed by the second duty ratio computation unit 35. The control signal output unit 36 compares the absolute value of the acquired first duty ratio DR1 with the absolute value of the acquired second duty ratio DR2. The control signal output unit 36 outputs a control signal which depends on a result of this comparison. The outputted control signal is inputted to the corresponding switching element SE. Thereby, the control of the drive circuit 22 by the motor control device 200 is implemented. As a result, the power supply to each phase is implemented (refer to FIG. 2), and thereby the rotor 5 is driven.

Here, when the absolute value of the first duty ratio DR1 is smaller than the absolute value of the second duty ratio DR2, the control signal output unit 36 outputs a control signal corresponding to the first duty ratio DR1. In contrast, when the absolute value of the second duty ratio DR2 is smaller than the absolute value of the first duty ratio DR1, the control signal output unit 36 outputs a control signal corresponding to the second duty ratio DR2. As a result, the second duty ratio DR2 corresponds to the upper limit of the absolute value of the first duty ratio DR1, as mentioned above. In other words, a duty ratio DR corresponding to the control signal outputted by the control signal output unit 36 (referred to as the "control duty ratio" hereinafter) is controlled to a value smaller than the upper limit.

More concretely, when the rotor 5 rotating forward is driven in the forward rotation direction, the control duty ratio DR has a value falling within a region A1 shown in FIG. 6. Further, when the rotor 5 rotating reversely is driven in the reverse rotation direction, the control duty ratio DR has a value falling within a region A2 shown in FIG. 6. Further, when the rotor 5 rotating reversely is driven in the forward rotation direction, the control duty ratio DR has a value falling within a region A3 shown in FIG. 6. Further, when the rotor 5 rotating forward is driven in the reverse rotation direction, the control duty ratio DR has a value falling within a region A4 shown in FIG. 6.

The main part of the motor control device 200 is configured in this way.

Hereinafter, the process performed by the target rotational position acquisition unit 31 may be generically referred to as the "target rotational position acquisition process." Further, the process performed by the rotational position computation unit 32 may be generically referred to as the "rotational position computation process." Further, the process performed by the number-of-rotations computation unit 33 may be generically referred to as the "number-of-rotations computation process." Further, the process performed by the first duty ratio computation unit 34 may be generically referred to as the "first duty ratio computation process." Further, the process performed by the second duty ratio computation unit 35 may be generically referred to as the "second duty ratio computation process." Further, the process performed by the control signal output unit 36 may be generically referred to as the "control signal output process."

Hereinafter, the function which the target rotational position acquisition unit 31 has may be generically referred to as the "target rotational position acquisition function." Further, the function which the rotational position computation unit 32 has may be generically referred to as the "rotational position computation function." Further, the function which the number-of-rotations computation unit 33 has may be generically referred to as the "number-of-rotations computation function." Further, the function which the first duty ratio computation unit 34 has may be generically referred to as the "first duty ratio computation function." Further, the function which the second duty ratio computation unit 35 has may be generically referred to as the "second duty ratio computation function." Further, the function which the control signal output unit 36 has may be generically referred to as the "control signal output function."

Hereinafter, a sign of "F1" may be used for the target rotational position acquisition function. Further, a sign of "F2" may be used for the rotational position computation function. Further, a sign of "F3" may be used for the number-of-rotations computation function. Further, a sign of "F4" may be used for the first duty ratio computation function. Further, a sign of "F5" may be used for the second duty ratio computation function. Further, a sign of "F6" may be used for the control signal output function.

Next, the hardware configuration of the main part of the motor control device 200 will be explained by referring to FIGS. 7 to 9.

Figure 7:
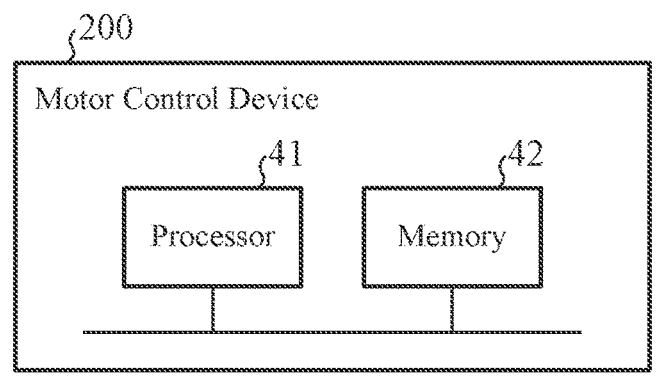
FIG. 7 is a block diagram showing a hardware configuration of a main part of the motor control device according to Embodiment 1.

The motor control device 200 has a processor 41 and a memory 42, as shown in FIG. 7. In the memory 42 is stored a program corresponding to the multiple functions F1 to F6 (including the target rotational position acquisition function, the rotational position computation function, the number-of-rotations computation function, the first duty ratio computation function, the second duty ratio computation function, and the control signal output function). The processor 41 reads and executes the program stored in the memory 42. Thereby, the multiple functions F1 to F6 are implemented.

Figure 8:
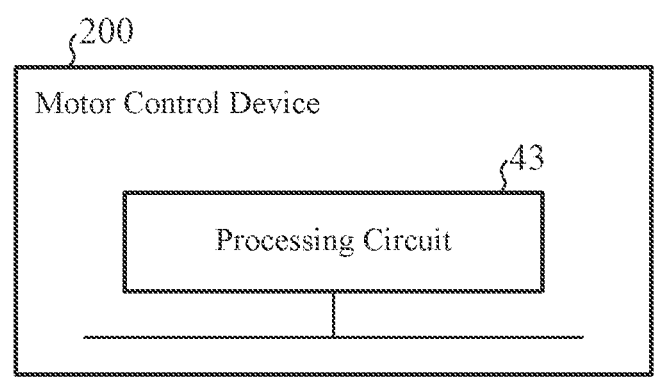
FIG. 8 is a block diagram showing another hardware configuration of the main part of the motor control device according to Embodiment 1.

Instead, the motor control device 200 has a processing circuit 43, as shown in FIG. 8. The processing circuit 43 performs the processes corresponding to the multiple functions F1 to F6. Thereby, the multiple functions F1 to F6 are implemented.

Figure 9:
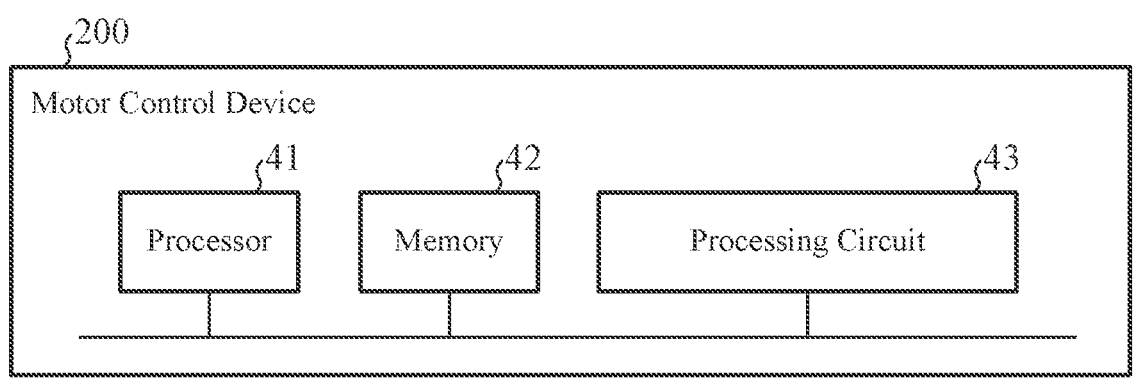
FIG. 9 is a block diagram showing another hardware configuration of the main part of the motor control device according to Embodiment 1.

Instead, the motor control device 200 has a processor 41, a memory 42, and a processing circuit 43, as shown in FIG. 9. In the memory 42 is stored a program corresponding to a part of the multiple functions F1 to F6. The processor 41 reads and executes the program stored in the memory 42. Thereby, the part of the functions is implemented. Further, the processing circuit 43 performs a process corresponding to the remaining part of the multiple functions F1 to F6. Thereby, the remaining part of the functions is implemented.

The processor 41 is constituted by one or more processors. For example, a central processing unit (CPU), a graphics processing unit (GPU), a microprocessor, a microcontroller, or a digital signal processor (DSP) is used as each processor.

The memory 42 is constituted by one or more nonvolatile memories. As an alternative, the memory 42 is constituted by one or more nonvolatile memories and one or more volatile memories. That is, the memory 42 is constituted by one or more memories. For example, a semiconductor memory or a magnetic disk is used as each memory. More concretely, for example, a random access memory (RAM) is used as each volatile memory. Further, for example, a read only memory (ROM), a flash memory, an erasable programmable read only memory (EPROM), an electrically erasable programmable read only memory (EEPROM), a solid state drive, or a hard disk drive is used as each nonvolatile memory.

The processing circuit 43 is constituted by one or more digital circuits. As an alternative, the processing circuit 43 is constituted by one or more digital circuits and one or more analog circuits. That is, the processing circuit 43 is constituted by one or more processing circuits. For example, an application specific integrated circuit (ASIC), a programmable logic device (PLD), a field-programmable gate array (FPGA), a system on a chip (SoC), or a system large scale integration (LSI) is used as each processing circuit.

Here, in the case where the processor 41 is constituted by multiple processors, the correspondence between the multiple functions F1 to F6 and the multiple processors can be freely determined. More specifically, each of the multiple processors may read and execute a program corresponding to one or more corresponding functions out of the multiple functions F1 to F6. As an alternative, the processor 41 may include processors for exclusive use which correspond to the respective multiple functions F1 to F6.

Further, in the case where the memory 42 is constituted by multiple memories, the correspondence between the multiple functions F1 to F6 and the multiple memories can be freely determined. More specifically, each of the multiple memories may store a program corresponding to one or more corresponding functions out of the multiple functions F1 to F6. As an alternative, the memory 42 may include memories for exclusive use which correspond to the respective multiple functions F1 to b F6.

Further, in the case where the processing circuit 43 is constituted by multiple processing circuits, the correspondence between the multiple functions F1 to F6 and the multiple processing circuits can be freely determined. More specifically, each of the multiple processing circuits may perform a process corresponding to one or more corresponding functions out of the multiple functions F1 to F6. As an alternative, the processing circuit 43 may include processing circuits for exclusive use which correspond to the respective multiple functions F1 to F6.

Figure 10:
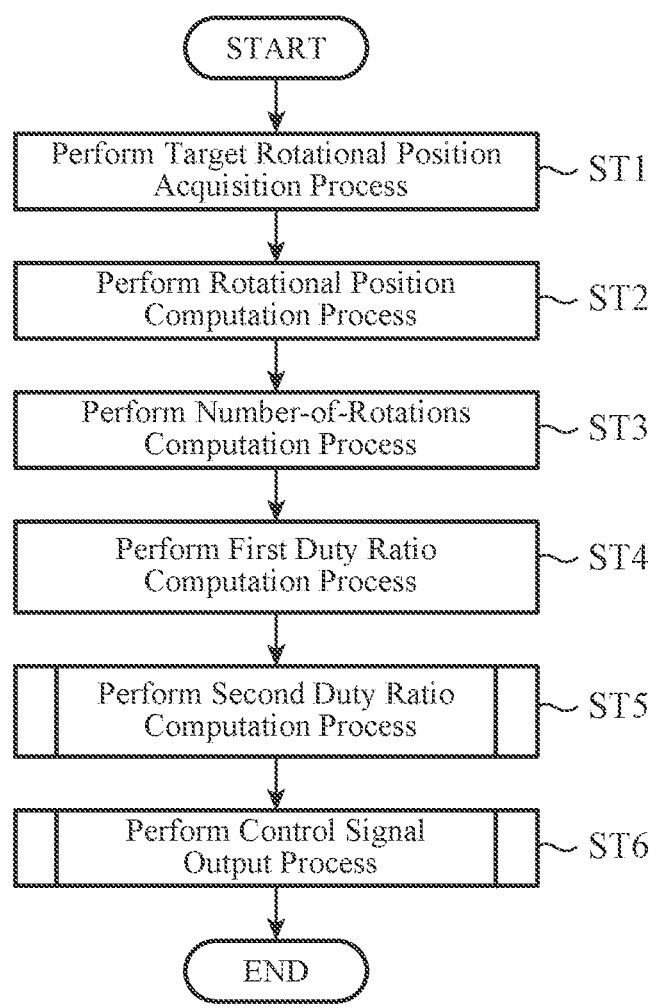
FIG. 10 is a flowchart showing the operation of the motor control device according to Embodiment 1.

Next, the operation of the motor control device 200 will be explained by referring to a flowchart of FIG. 10. The processing shown in FIG. 10 is repeatedly performed when a predetermined condition is satisfied (for example, when the power supply to the brushless DC motor 100 by the external power supply 300 is in the on-state).

First, the target rotational position acquisition unit 31 performs the target rotational position acquisition process (step ST1). Then, the rotational position computation unit 32 performs the rotational position computation process (step ST2). Then, the number-of-rotations computation unit 33 performs the number-of-rotations computation process (step ST3). Then, the first duty ratio computation unit 34 performs the first duty ratio computation process (step ST4). Then, the second duty ratio computation unit 35 performs the second duty ratio computation process (step ST5). Then, the control signal output unit 36 performs the control signal output process (step ST6).

Figure 11:
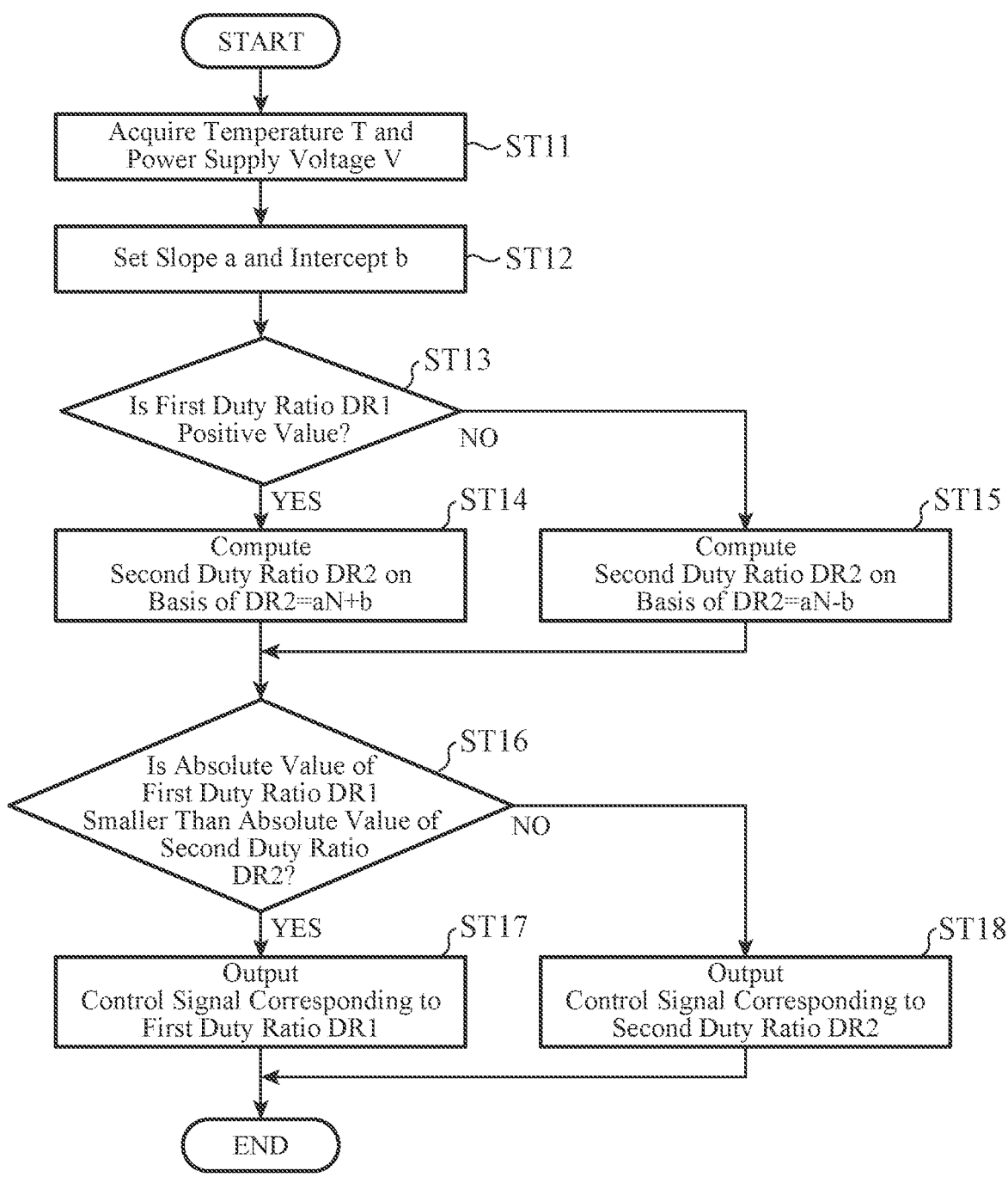
FIG. 11 is a flowchart showing the operations of the second duty ratio computation unit and a control signal output unit in the motor control device according to Embodiment 1.

Next, the operations of the second duty ratio computation unit 35 and the control signal output unit 36 will be explained by referring to a flowchart shown in FIG. 11. More specifically, the processes performed in steps ST5 and ST6 will be explained.

First, the second duty ratio computation unit 35 acquires the temperature T and the power supply voltage V (step ST11). The temperature T is acquired from the temperature sensor 24. The power supply voltage V is acquired from the power supply circuit 21.

Then, the second duty ratio computation unit 35 sets the slope a and the intercept b, using the temperature T and the power supply voltage V which are acquired in step ST11 (step ST12). At this time, the slope a is set to a value which is based on the equations (3) and (4). Further, the intercept b is set to a value which is based on the equations (5) and (6).

Then, the second duty ratio computation unit 35 determines whether the first duty ratio DR1 computed in step ST4 is positive or negative, using the positive/negative information outputted in step ST4 (step ST13). When the first duty ratio DR1 is a positive value (when "YES" in step ST13), the second duty ratio computation unit 35 computes the second duty ratio DR2 on the basis of the equation (1) (step ST14). In contrast, when the first duty ratio DR1 is a negative value (when "NO" in step ST13), the second duty ratio computation unit 35 computes the second duty ratio DR2 on the basis of the equation (2) (step ST15).

Then, the control signal output unit 36 compares the absolute value of the first duty ratio DR1 computed in step ST4 with the absolute value of the second duty ratio DR2 computed in step ST14 or ST15 (step ST16). When the absolute value of the first duty ratio DR1 is smaller than the absolute value of the second duty ratio DR2 (when "YES" in step ST16), the control signal output unit 36 outputs a control signal corresponding to the first duty ratio DR1 (step ST17). In contrast, when the absolute value of the second duty ratio DR2 is smaller than the absolute value of the first duty ratio DR1 (when "NO" in step ST16), the control signal output unit 36 outputs a control signal corresponding to the second duty ratio DR2 (step ST18). The control signal outputted in step ST17 or ST18 is inputted to the corresponding switching element SE.

Next, advantageous effects of the brushless DC motor 100 will be explained.

First, the control duty ratio DR can be made to be a value smaller than a predetermined value (more concretely, the upper limit corresponding to the second duty ratio DR2). This makes it possible to control the current value I in the brushless DC motor 100 (more concretely, the current value i in each phase) to a value smaller than a predetermined value. Further, the current value I can also be controlled to a maximum value by the computation expression used in the first duty ratio computation unit 34.

At this time, the first duty ratio computation unit 34 computes the first duty ratio DR1 by means of the feedback of the rotational position RP. More concretely, the first duty ratio computation unit 34 computes the first duty ratio DR1 using the target rotational position TRP, the rotational position RP, and the number of rotations N. Further, the second duty ratio computation unit 35 computes the second duty ratio DR2 on the basis of the linear function including a variable corresponding to the number of rotations N. Therefore, the necessity to provide the feedback of the current value I when controlling the current value I to a value smaller than the predetermined value can be eliminated. This makes it possible to simplify the circuit configuration of the brushless DC motor 100 as compared with the case of using the feedback of the current value I.

Figure 12:
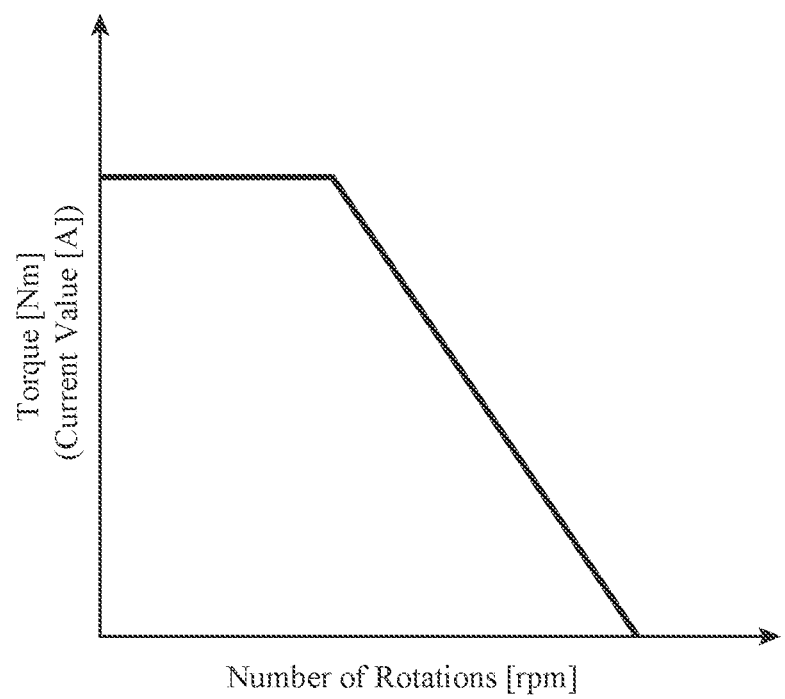
FIG. 12 is a characteristic diagram showing an example of torque with respect to the number of rotations.

In other words, the same control as that using the feedback of the current value I can be implemented without using the feedback of the current value I. Concretely, for example, control to vary a voltage applied to the brushless DC motor 100 can be implemented while keeping the torque TR and the current value I in the brushless DC motor 100 constant. More specifically, in general, the counter electromotive voltage which obstructs the generation of the torque TR increases gradually as the number of rotations N increases. In contrast with this, because the control duty ratio DR can be varied continuously, the above-mentioned control can be implemented. FIG. 12 is a characteristic diagram showing an example of the torque TR (i.e., the current value I) with respect to the number of rotations N.

Second, the motor control device 200 is disposed on the board 16. In other words, the motor control device 200 is integral with the motor body portion 400. This makes it possible to eliminate the necessity to dispose the motor control device 200 outside the motor body portion 400. As a result, the brushless DC motor 100 can be compact.

Third, the main magnet 6 is disposed in the rotor 5, and the sensor magnet 10 is disposed in the rotor 5. In other words, the main magnet 6 and the sensor magnet 10 are integral with the rotor 5. This makes it possible to prevent a deviation of the magnetization position of the sensor magnet 10 from occurring with respect to the magnetization position of the main magnet 6. As a result, it is possible to prevent a deviation of the rotational position RP computed by the rotational position computation unit 32 from occurring with respect to the actual rotational position RP.

Fourth, each of the following values: the slope a and the intercept b is set to a value which differs depending on the difference value $\Delta T$ between the temperature T and the reference temperature T_ref. Further, each of the following values: the slope a and the intercept b is set to a value which differs depending on the power supply voltage V. More concretely, the slope a is set to a value which is based on the equations (3) and (4). Further, the intercept b is set to a value which is based on the equations (5) and (6). This makes it possible to set each of the following values: the slope a and the intercept b to a proper value for variations in the magnetic force and variations in the resistance which result from variations in the temperature T and variations in the power supply voltage V. In other words, each of the regions A1, A2, A3, and A4 can be set to a proper one for these variations.

Fifth, it is possible not only to drive the brushless DC motor 100 in the forward rotation direction, but also to drive the brushless DC motor 100 in the reverse rotation direction, depending on whether the first duty ratio DR1 is positive or negative. This makes it possible to use the brushless DC motor 100 for various purposes. In other words, the applications of the brushless DC motor 100 can be increased.

Next, a variant of the brushless DC motor 100 will be explained.

The first duty ratio computation unit 34 may output the positive/negative information to the control signal output unit 36, instead of outputting the positive/negative information to the second duty ratio computation unit 35.

In this case, while the second duty ratio computation unit 35 computes the second duty ratio DR2 which is based on the equation (1), the second duty ratio computation unit 35 computes the second duty ratio DR2 which is based on the equation (2). More specifically, the second duty ratio computation unit 35 computes the two second duty ratios DR2 for each time ($t_n$). The second duty ratio computation unit 35 outputs the two computed second duty ratios DR2 to the control signal output unit 36. The control signal output unit 36 selects one second duty ratio DR2 corresponding to whether the first duty ratio DR1 is positive or negative, out of the two computed second duty ratios DR2, using the positive/negative information.

The control signal output unit 36 compares the absolute value of the above-mentioned selected second duty ratio DR2 with the absolute value of the first duty ratio DR1. When the absolute value of the above-mentioned selected second duty ratio DR2 is smaller than the absolute value of the first duty ratio DR1, the control signal output unit 36 outputs a control signal corresponding to the above-mentioned selected second duty ratio DR2.

Next, another variant of the brushless DC motor 100 will be explained.

In at least one of the following processes: the computation of the rotational position RP by the rotational position computation unit 32; the computation of the number of rotations N by the number-of-rotations computation unit 33; the computation of the first duty ratio DR1 by the first duty ratio computation unit 34; the acquisition of the temperature T by the second duty ratio computation unit 35; the acquisition of the power supply voltage V by the second duty ratio computation unit 35; and the computation of the second duty ratio DR2 by the second duty ratio computation unit 35, a moving average may be used.

More specifically, the rotational position computation unit 32 may compute, as to M rotational positions RP_1 to RP_M corresponding to M continuous times ($t_1$ to $t_M$), a moving average of the M rotational positions RP_1 to RP_M. In this case, this moving average may be used for the computation of the number of rotations N. Further, the moving average may be used for the computation of the first duty ratio DR1. Here, M is an integer greater than or equal to 2.

Further, the number-of-rotations computation unit 33 may compute, as to M numbers of rotations N_1 to N_M corresponding to the M continuous times ($t_1$ to $t_M$), a moving average of the M numbers of rotations N_1 to N_M. In this case, this moving average may be used for the computation of the first duty ratio DR1. Further, the moving average may be used for the computation of the second duty ratio DR2.

Further, the first duty ratio computation unit 34 may compute, as to M first duty ratios DR1_1 to DR1_M corresponding to the M continuous times ($t_1$ to $t_M$), a moving average of the M first duty ratios DR1_1 to DR1_M. In this case, the first duty ratio computation unit 34 may output the moving average to the control signal output unit 36, instead of outputting the first duty ratio DR1 for each time ($t_n$) to the control signal output unit 36.

Further, the second duty ratio computation unit 35 may compute, as to M temperatures T_1 to T_M corresponding to the M continuous times ($t_1$ to $t_M$), a moving average of the M temperatures T_1 to T_M. In this case, this moving average may be used for the setting of the slope a. Further, the moving average may be used for the setting of the intercept b.

Further, the second duty ratio computation unit 35 may compute, as to M power supply voltages V_1 to V_M corresponding to the M continuous times ($t_1$ to $t_M$), a moving average of the M power supply voltages V_1 to V_M. In this case, this moving average may be used for the setting of the slope a. Further, the moving average may be used for the setting of the intercept b.

Further, the second duty ratio computation unit 35 may compute, as to M second duty ratios DR2_1 to DR2_M corresponding to the M continuous times ($t_1$ to $t_M$), a moving average of the M second duty ratios DR2_1 to DR2_M. In this case, the second duty ratio computation unit 35 may output this moving average to the control signal output unit 36, instead of outputting the second duty ratio DR2 for each time ($t_n$) to the control signal output unit 36.

As an alternative, the control signal output unit 36 may compute, as to M control duty ratios DR_1 to DR_M corresponding to the M continuous times ($t_1$ to $t_M$), a moving average of the M control duty ratios DR_1 to DR_M. The control signal output unit 36 may output a control signal corresponding to this moving average.

By using these moving averages, the following advantageous effect can be provided. More specifically, as to detected values provided by each of the sensors (including the rotational position sensor 23 and the temperature sensor 24), an error may occur in at least one of M detected values corresponding to the M continuous times ($t_1$ to $t_M$). At this time, the influence of this error can be reduced. As a result, a manipulated variable θ corresponding to the control signal outputted by the control signal output unit 36 can be stabilized.

In contrast, the amount of computation in the motor control device 200 can be reduced by not using these moving averages. In other words, by reducing the number of units in the motor control device 200 each of which computes a moving average, the amount of computation in the motor control device 200 can be reduced. Particularly, it is preferable not to use a moving average for a parameter having a low probability of occurrence of errors as mentioned above.

Next, another variant of the brushless DC motor 100 will be explained.

As mentioned above, the number of poles of the sensor magnet 10 may be set to be equal to the number of field systems of the brushless DC motor 100. In contrast with this, the number of poles of the sensor magnet 10 may be set to be an integral multiple of the number of field systems of the brushless DC motor 100.

Figure 13:
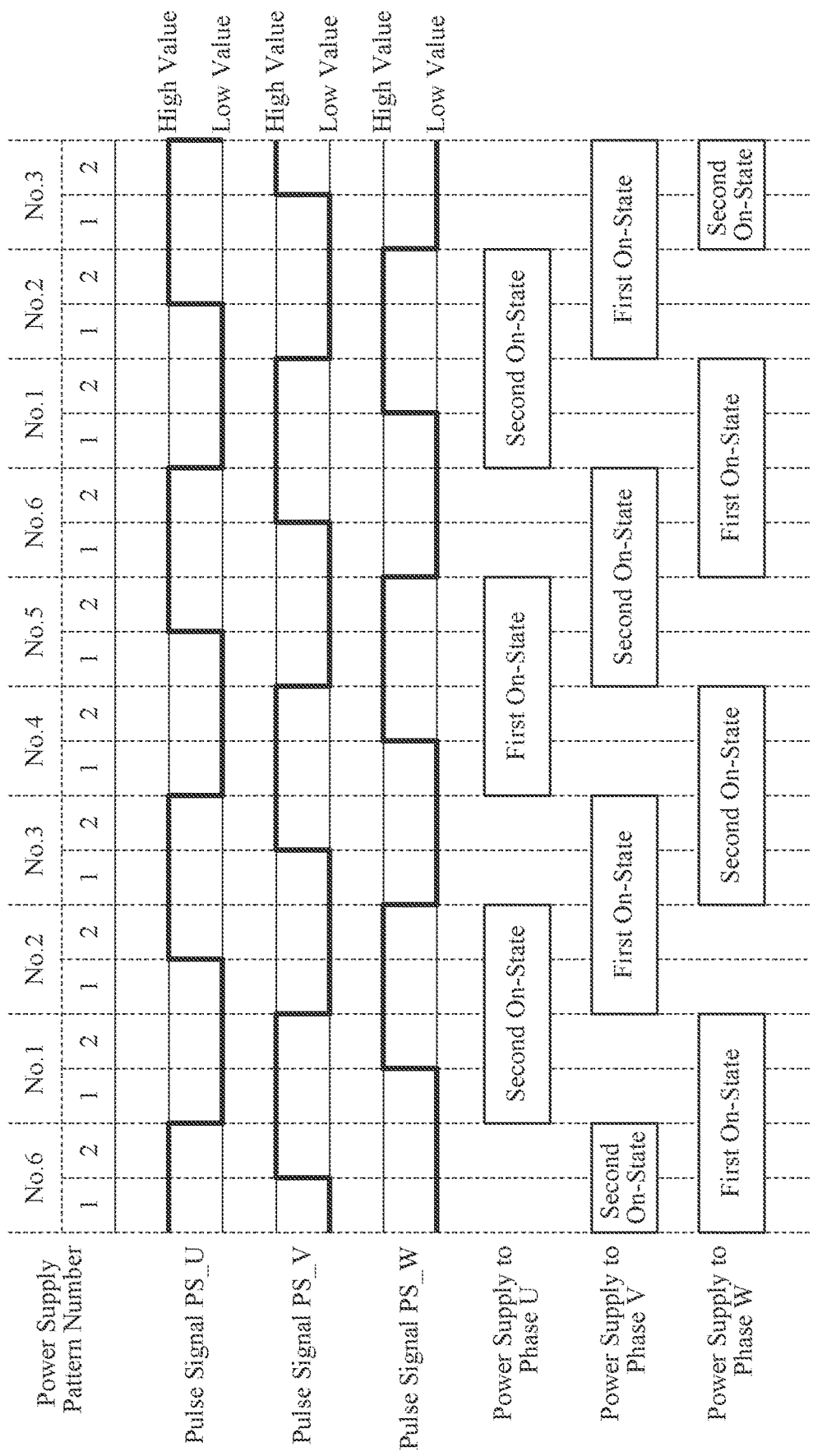
FIG. 13 is an explanatory drawing showing another example of the pulse signal outputted by each magnetic sensor, and another example of times when the power supply to each phase is in the on-state.

Concretely, for example, the number of poles of the sensor magnet 10 may be set to be twice as large as the number of field systems of the brushless DC motor 100. FIG. 13 shows an example of times when the power supply to each phase in this case is in the on-state. Further, FIG. 13 shows an example of the pulse signal PS outputted by each magnetic sensor MS in this case.

This makes it possible to set the period of the pulse signal PS outputted by each magnetic sensor MS to one half of that in the example shown in FIG. 2. As a result, the control resolution of the control of the drive circuit 22 by the motor control device 200 can be improved by a factor of two.

Next, a concrete example of the applications of the brushless DC motor 100 will be explained.

Figure 14:
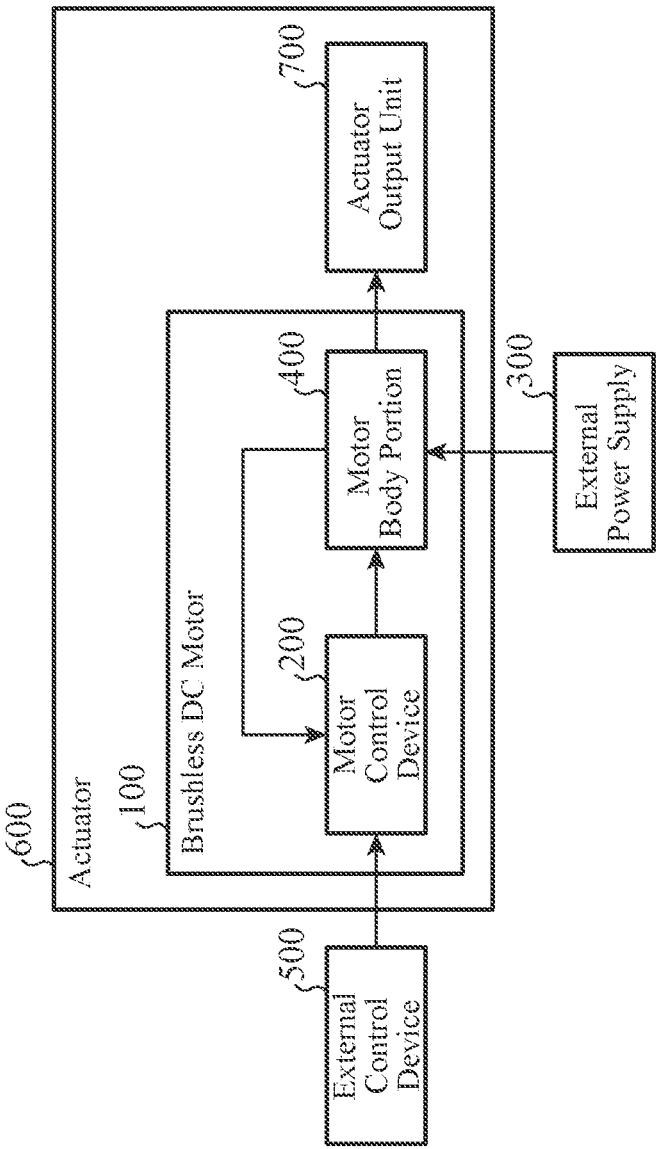
FIG. 14 is a block diagram showing a main part of an actuator which includes the brushless DC motor including the motor control device according to Embodiment 1.

As shown in FIG. 14, the brushless DC motor 100 may be used for an actuator 600. The actuator 600 includes the brushless DC motor 100 and an actuator output unit 700. The actuator output unit 700 includes, for example, an output shaft mechanically connected to the shaft 9 of the rotor 5.

The actuator 600 is used for, for example, the opening control of an EGR valve, a wastegate valve or a throttle valve. In this case, the output shaft of the actuator output unit 700 is mechanically connected to a valve element of this valve. As the rotor 5 rotates, the opening of the valve varies. On the other hand, the opening of the valve is maintained by maintaining the rotational position RP of the rotor 5.

Here, the actuator output unit 700 may include a member (e.g., a spring) that causes a so-called "return torque" to occur. In this case, the opening of the valve may be controlled by the balance between the return torque caused by this member and the torque TR caused by the brushless DC motor 100. Concretely, for example, the opening of the valve may be controlled by the balance between the torque TR for the opening direction of the valve element and the return torque for the closing direction of the valve element.

Next, a concrete example of the applications of the actuator 600 will be explained.

Figure 15:
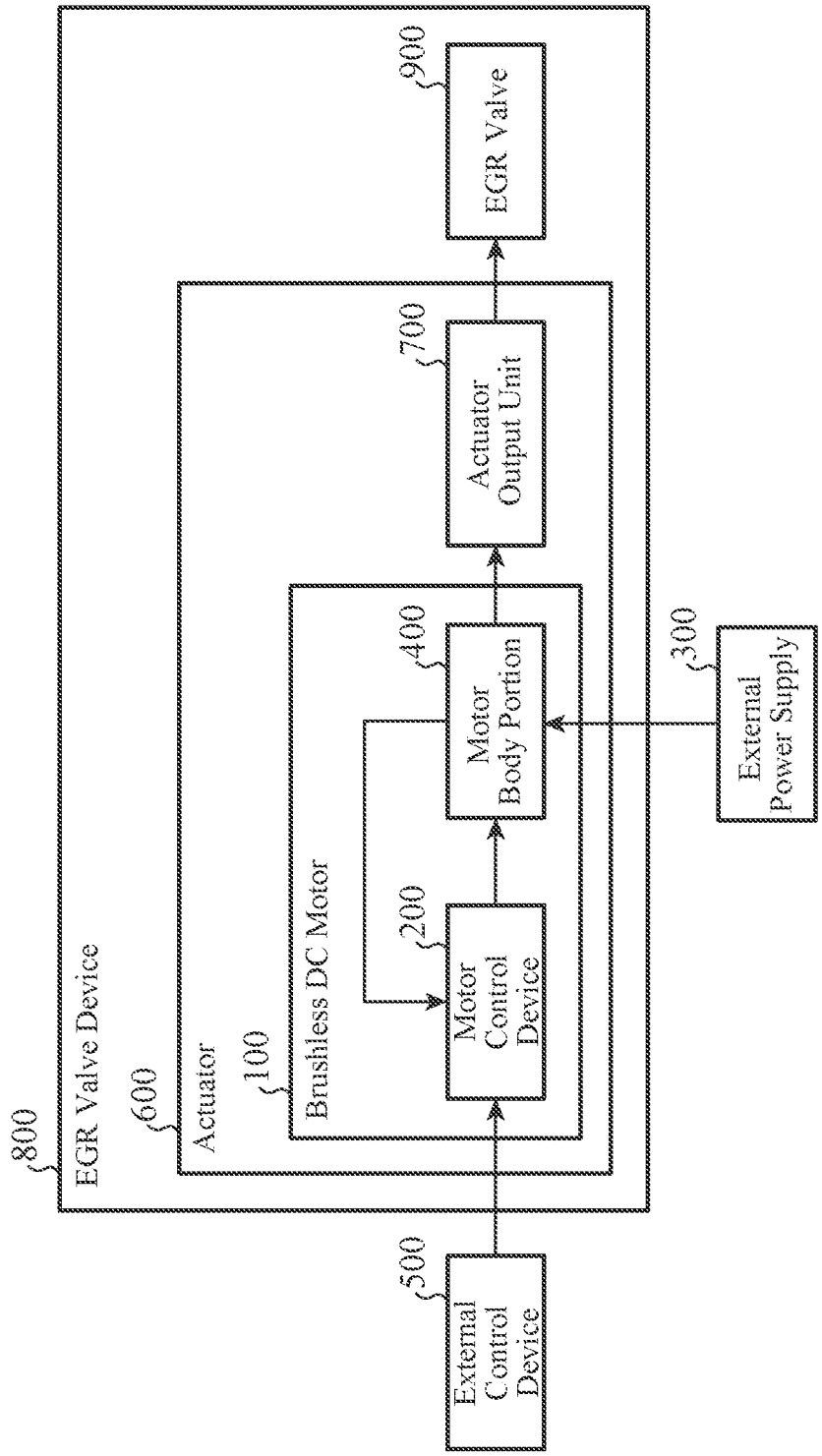
FIG. 15 is a block diagram showing a main part of an EGR valve device which includes the actuator including the brushless DC motor including the motor control device according to Embodiment 1.

The actuator 600 may be used for an EGR valve device 800, as shown in FIG. 15. The EGR valve device 800 includes the actuator 600 and an EGR valve 900. The output shaft of the actuator output unit 700 is mechanically connected to a valve element of the EGR valve 900. As the rotor 5 rotates, the opening of the EGR valve 900 varies. On the other hand, the opening of the EGR valve 900 is maintained by maintaining the rotational position RP of the rotor 5. More specifically, the opening of the EGR valve 900 is controlled by the actuator 600.

As mentioned above, the motor control device 200 according to Embodiment 1 includes: the target rotational position acquisition unit 31 to acquire the target rotational position TRP of the rotor 5 in the motor body portion 400; the rotational position computation unit 32 to compute the rotational position RP of the rotor 5 using the pulse signal PS outputted by the rotational position sensor 23 in the motor body portion 400; the number-of-rotations computation unit 33 to compute the number of rotations N of the rotor 5 on the basis of the rotational position RP; the first duty ratio computation unit 34 to compute the first duty ratio DR1 to be used for the control of the motor body portion 400 on the basis of the target rotational position TRP and the rotational position RP; the second duty ratio computation unit 35 to compute the second duty ratio DR2 corresponding to the upper limit of the absolute value of the first duty ratio DR1 on the basis of the linear function including a variable corresponding to the number of rotations N; and the control signal output unit 36 to output a control signal corresponding to the first duty ratio DR1 when the absolute value of the first duty ratio DR1 is smaller than the absolute value of the second duty ratio DR2, and to output a control signal corresponding to the second duty ratio DR2 when the absolute value of the second duty ratio DR2 is smaller than the absolute value of the first duty ratio DR1. This makes it possible to eliminate the necessity to provide the feedback of the current value I when controlling the current value I in the motor (e.g., the brushless DC motor 100) to a value smaller than the predetermined value. As a result, the circuit configuration of this motor can be simplified. Further, the control duty ratio DR can be varied continuously.

Further, the slope a of the linear function is set to a value which differs depending on the difference value ΔT between the temperature T in the motor body portion 400 and the reference temperature T_ref, and the intercept b of the linear function is set to a value which differs depending on the difference value ΔT. This makes it possible to set each of the following values: the slope a and the intercept b to a proper value for variations in the temperature T.

Further, the slope a of the linear function is set to a value which differs depending on the power supply voltage V in the motor body portion 400, and the intercept b of the linear function is set to a value which differs depending on the power supply voltage V. This makes it possible to set each of the following values: the slope a and the intercept b to a proper value for variations in the power supply voltage V.

Further, the slope a of the linear function is set to a value which depends on the phase induced voltage constant ke in the motor body portion 400. This makes it possible to set the slope a to a proper value depending on the phase induced voltage constant ke.

Further, the intercept b of the linear function is set to a value which depends on the phase current limit value i_lim in the motor body portion 400. This makes it possible to set the intercept b to a proper value depending on the phase current limit value i_lim. As a result, the occurrence of an excess current can be avoided.

Further, a moving average is used for the computation of the first duty ratio DR1. This makes it possible to stabilize the manipulated variable θ.

Further, a moving average is used for the computation of the second duty ratio DR2. This makes it possible to stabilize the manipulated variable θ.

Further, the motor control device 200 is integral with the motor body portion 400. This makes it possible to make the motor (e.g., the brushless DC motor 100) compact.

Further, whether the first duty ratio DR1 is positive or negative is set depending on the driving direction of the rotor 5, and whether the intercept b of the linear function is positive or negative is set depending on whether the first duty ratio DR1 is positive or negative. This makes it possible not only to drive the rotor 5 in the forward rotation direction, but also to drive the rotor 5 in the reverse rotation direction. As a result, applications of the motor (e.g., the brushless DC motor 100) can be increased.

Further, the brushless DC motor 100 according to Embodiment 1 includes the motor control device 200 and the motor body portion 400. This makes it possible to implement the brushless DC motor 100 which uses the motor control device 200.

Further, the magnetic sensor MS is used as the rotational position sensor 23, a magnet (the sensor magnet 10) is used for the generation of a pulse signal PS in the motor body portion 400, and the number of poles of the magnet (the sensor magnet 10) is set to be equal to the number of field systems of the motor body portion 400. This makes it possible to generate a pulse signal PS for each phase.

Further, the magnetic sensor MS is used as the rotational position sensor 23, a magnet (the sensor magnet 10) is used for the generation of a pulse signal PS in the motor body portion 400, and the number of poles of the magnet (the sensor magnet 10) is set to be an integral multiple of the number of field systems of the motor body portion 400. This makes it possible to generate a pulse signal PS for each phase. Further, the control resolution can be improved.

Further, the actuator 600 according to Embodiment 1 includes the brushless DC motor 100. This makes it possible to implement the actuator 600 which uses the brushless DC motor 100.

Further, the actuator 600 is to be used for the opening control of the EGR valve 900, a wastegate valve, or a throttle valve. The actuator 600 can be used for the opening control of a vehicle-mounted valve in this way.

Further, the EGR valve device 800 according to Embodiment 1 includes the actuator 600 and the EGR valve 900, and the opening of the EGR valve 900 is controlled by the actuator 600. This makes it possible to implement the EGR valve device 800 which uses the actuator 600.

It is to be understood that various changes can be made in any component according to the embodiment or any component according to the embodiment can be omitted within the scope of the present disclosure.

INDUSTRIAL APPLICABILITY

The motor control device according to the present disclosure can be used for, for example, brushless DC motors. The brushless DC motor according to the present disclosure can be used for, for example, actuators. The actuator according to the present disclosure can be used for, for example, EGR valve devices. The EGR valve device according to the present disclosure can be used for, for example, vehicles.

REFERENCE SIGNS LIST

1 stator, 2 stator core, 3 insulator, 4 coil, 5 rotor, 6 main magnet, 7 rotor core, 8 resin molded portion, 9 shaft, 10 sensor magnet, 11 bearing, 12 bearing, 13 housing, 14 cover, 15 housing portion, 16 board, 21 power supply circuit, 22 drive circuit, 23 rotational position sensor, 24 temperature sensor, 31 target rotational position acquisition unit, 32 rotational position computation unit, 33 number-of-rotations computation unit, 34 first duty ratio computation unit, 35 second duty ratio computation unit, 36 control signal output unit, 41 processor, 42 memory, 43 processing circuit, 100 brushless DC motor, 200 motor control device, 300 external power supply, 400 motor body portion, 500 external control device, 600 actuator, 700 actuator output unit, 800 EGR valve device, and 900 EGR valve.

The invention claimed is:

1. A motor control device comprising:
   processing circuitry
   to acquire a target rotational position of a rotor in a motor body portion;

to compute a rotational position of the rotor using a pulse signal outputted by a rotational position sensor in the motor body portion;
to compute the number of rotations of the rotor on a basis of the rotational position;
to compute a first duty ratio to be used for control of the motor body portion on a basis of the target rotational position and the rotational position;
to compute a second duty ratio corresponding to an upper limit of an absolute value of the first duty ratio on a basis of a first linear function including a variable corresponding to the number of rotations; and
to output a control signal corresponding to the first duty ratio when the absolute value of the first duty ratio is smaller than an absolute value of the second duty ratio, and to output a control signal corresponding to the second duty ratio when the absolute value of the second duty ratio is smaller than the absolute value of the first duty ratio, wherein
a slope of the first linear function is computed on a basis of a second linear function which includes, as a variable, a difference between an ambient temperature of a board in the motor body portion and a reference temperature,
as the difference increases, the slope increases, and
as the difference decreases, the slope decreases.

2. The motor control device according to claim 1, wherein
an intercept of the first linear function is computed on a basis of a third linear function which includes the difference as a variable,
as the difference increases, the intercept increases, and
as the difference decreases, the intercept decreases.

3. The motor control device according to claim 1, wherein
the slope of the first linear function is set to a value which differs depending on a power supply voltage in the motor body portion, and
an intercept of the first linear function is set to a value which differs depending on the power supply voltage.

4. The motor control device according to claim 1, wherein the slope of the first linear function is set to a value which depends on a phase induced voltage constant in the motor body portion.

5. The motor control device according to claim 2, wherein the intercept of the first linear function is set to a value which depends on a phase current limit value in the motor body portion.

6. The motor control device according to claim 1, wherein a moving average is used for the computation of the first duty ratio.

7. The motor control device according to claim 1, wherein a moving average is used for the computation of the second duty ratio.

8. The motor control device according to claim 1, wherein the motor control device is integral with the motor body portion.

9. The motor control device according to claim 1, wherein
whether the first duty ratio is positive or negative is set depending on a driving direction of the rotor, and
whether an intercept of the first linear function is positive or negative is set depending on whether the first duty ratio is positive or negative.

10. A brushless DC motor comprising:
the motor control device according to claim 1; and
the motor body portion.

11. The brushless DC motor according to claim 10, wherein
a magnetic sensor is used as the rotational position sensor,
a magnet is used for generation of the pulse signal in the motor body portion, and
the number of poles of the magnet is set to be equal to the number of field systems of the motor body portion.

12. The brushless DC motor according to claim 10, wherein
a magnetic sensor is used as the rotational position sensor,
a magnet is used for generation of the pulse signal in the motor body portion, and
the number of poles of the magnet is set to be an integral multiple of the number of field systems of the motor body portion.

13. An actuator comprising the brushless DC motor according to claim 10.

14. The actuator according to claim 13, wherein the actuator is to be used for opening control of an EGR valve, a wastegate valve, or a throttle valve.

15. An EGR valve device comprising:
the actuator according to claim 13; and an EGR valve,
wherein an opening of the EGR valve is controlled by the actuator.

* * * * *